United States Patent [19]

Steipe

[11] 4,078,742
[45] Mar. 14, 1978

[54] MAGNETIC TAPE CARTRIDGE

[76] Inventor: Leo Steipe, 8131 Bachhausen, Post Aufkirchen uber, Starnberg, Germany

[21] Appl. No.: 658,069

[22] Filed: Feb. 13, 1976

[30] Foreign Application Priority Data

Dec. 5, 1975 Germany .............................. 2554688

[51] Int. Cl.² .................... G03B 1/04; G11B 15/32; G11B 23/04
[52] U.S. Cl. .................... 242/199; 360/96; 360/132
[58] Field of Search .............. 242/197–200, 242/55, 19 A, 210; 352/72–78 R; 360/93, 96, 132

[56] References Cited

U.S. PATENT DOCUMENTS

| | | | |
|---|---|---|---|
| 3,341,142 | 9/1967 | Namenyi-Katz | 242/199 |
| 3,495,787 | 2/1970 | Wallace | 242/199 |
| 3,598,339 | 8/1971 | Saito | 242/199 |
| 3,826,489 | 7/1974 | Watkins, Jr. | 360/132 |
| 3,851,115 | 11/1974 | Zacaroli | 242/210 X |

*Primary Examiner*—Leonard D. Christian
*Attorney, Agent, or Firm*—Bacon & Thomas

[57] ABSTRACT

The specification describes a magnetic tape cartridge, more particularly a miniature one, with access openings arranged in one narrow side of the cartridge housing for the magnetic heads. The magnetic tape is supported in the access openings on resilient cushions. In the direction of tape travel upstream and downstream and between the access openings guide pins, fixed to the cartridge housing, are provided for the magnetic tape. The cushions are arranged on the arms of a double lever of resiliently elastic material, which is held by joint lugs and a pin in two plan-parallel flat strips fixed to the cartridge so as to allow pivoting movement. The strips extend perpendicularly and fit immediately underneath the narrow side having the access openings and the strips are fixedly connected together by the guide pins with a spacing between the strips.

5 Claims, 4 Drawing Figures

MAGNETIC TAPE CARTRIDGE

BACKGROUND OF INVENTION

(1) Field to which Invention Relates

The invention relates to a magnetic tape cartridge, more particularly to a miniature cartridge, with access openings, arranged in a narrow side of the cartridge housing, for the magnetic heads, in which the magnetic tape is supported on resilient cushions, while in the direction of tape travel upstream from, downstream from and between the access openings guide pins, fixed to the cartridge housing, are provided for the magnetic tape.

(2) The Prior Art

In the case of magnetic tape cartridges of this type there has already been a proposal to provide the cushions on resilient elements fixed to the housing and to arrange the guide pins directly in the side walls of the cartridge housing. Apart from the fact that such constructions involve substantial manufacturing complexity, the narrow side, having the large distances, present in the case of these magnetic tape cartridges, between the guide pins and the access openings, has a disadvantageous effect on the magnetic head arrangement and the guidance of the magnetic tape. In the case of another previously proposed magnetic tape cartridge the cushions were to be arranged on spring arms, which are arranged in a pivoting manner on a rocking lever carrying the guide pins and journalled in the cartridge housing. The possibility of pivoting movement of the rocking lever however again leads to excessively large distances between the guide pins and the narrow side of the cartridge housing.

SUMMARY OF INVENTION

One aim of the present invention is that of affording measures which can avoid the defects mentioned.

The invention consists in a magnetic tape cartridge, more particularly a miniature cartridge, with access openings, arranged in a narrow side of the cartridge housing, for the magnetic heads, in which the magnetic tape is supported on resilient cushions, while in the direction of tape travel upstream from, downstream from and between the access openings guide pins, fixed to the cartridge housing, are provided for the magnetic tape, characterized in that the cushions are arranged on the arms of a two-armed lever of resiliently elastic material, which is held in a rocking fashion by means of joint lugs and by means of a pin in two flat strips which are plan-parallel and are fixed to the housing and the strips extend perpendicularly and fit directly behind the narrow side having the access openings and the strips are connected fixedly with each other with a spacing between them by means of the guide pins. Preferably the flat strips are fixed by the pin in the cartridge housing and lie against the side walls of the cartridge housing and/or are supported against the narrow side on the inside.

In the case of the magnetic tape cartridge the double lever or two-armed lever and the flat strips, which are preferably made with a considerable length, form together with the guide pins a pre-fabricated unit, which can be placed as such into the cartridge housing and which in the case of cartridge housings made up of halves can be used to assist connection of the halves with each other. The pin or bearing pin can for this purpose have its ends extending beyond the flat strips at the mutually remote sides and the ends of the pin can fit into the side walls and by means of upsetting or riveting can engage the halves of the cartridge housing to press them together. The flat strips furthermore make possible holding the guide pins with a substantial distance between each other and in any desired plane with respect to the narrow side, more particularly in the plane corresponding to the cassette abutment so that a substantially playfree guidance of the magnetic tape perpendicularly to the direction of tape travel is made possible. In turn this ensures that only short movement, free of hinderance, of the magnetic heads are necessary, which if necessary can also be turned through a predetermined angular range. In fact as is known the tape tension leads to additional pressing forces of the magnetic tape being exerted on the magnetic heads with an optimum degree of wrap and an enlarged free space is provided for the magnetic tape coil in the interior of the cartridge housing. Furthermore, the flat strips act as screening bodies, which adjacent to the access openings can be provided with recesses if desired.

LIST OF SEVERAL VIEWS OF DRAWINGS

One embodiment of the invention will now be described with reference to the accompanying drawings.

DESCRIPTION OF PREFERRED EMBODIMENTS

Figure 1:
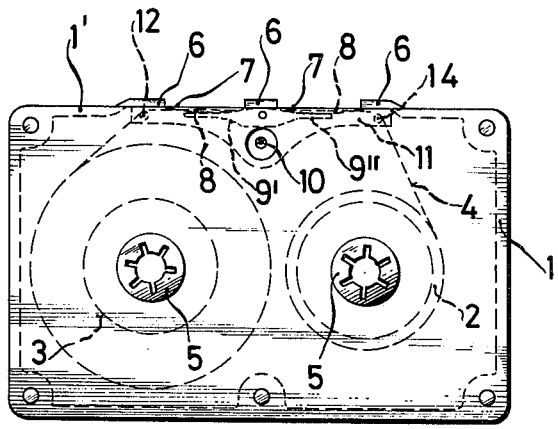
FIG. 1 shows is a view which a magnetic tape cartridge in plan view.
Figure 2:
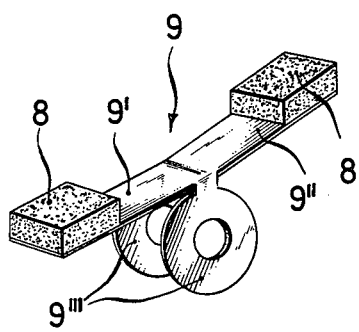
FIG. 2 shows is a view which a double lever with cushions in perspective.
Figure 3:
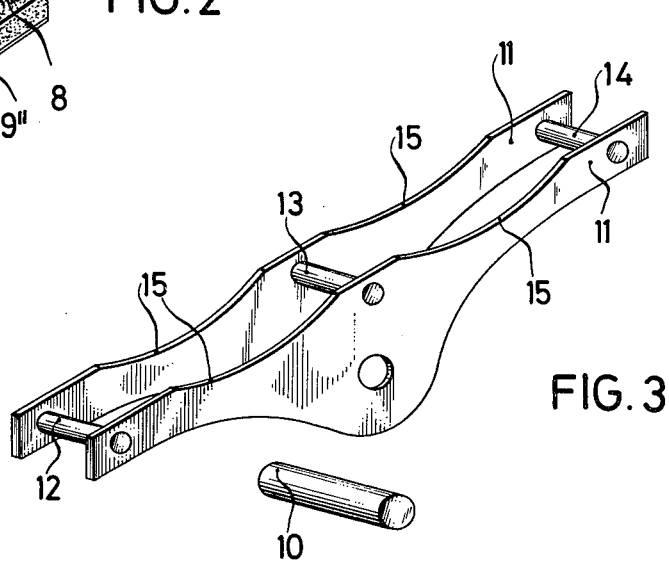
FIG. 3 shows is a view which a pair of flat strips with a pin in persrecitive.
Figure 4:
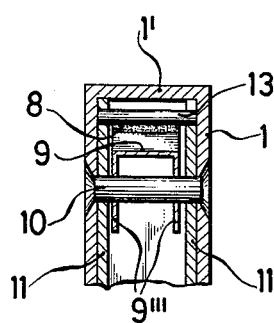
FIG. 4 shows is a view which a part view of a magnetic tape cartridge.

The cartridge housing 1 is formed by housing halves of plastics material. It accommodates rotary spool bodies or cores 2 and 3 for the magnetic tape 4, which in openings 5 can be coupled in a conventional manner with the driving means of the magnetic tape recorder. The cartridge housing 1 has moulded on projections 6 and between the latter there are access openings 7 for magnetic heads which are also conventional.

Adjacent to the access openings 7 the magnetic tape 4 is underlain by cushions 8 and is supported. The cushions 8 are carried by the arms 9' and 9" of a double or two-armed lever 9 of resiliently elastic material. The two-armed lever 9 is held in a manner allowing tilting movement by means of joint lugs 9''' and a pin 10 on flat strips 11 which are arranged perpendicularly and are fixed to the cartridge housing. The flat strips 11 are connected together by means of guide pins 12, 13, and 14 which preferably lie in a single plane.

In the case of the embodiment the pin 10 extends on the outside beyond the flat strips 11. It passes through the side walls of the cartridge housing 1 and makes possible, for example by riveting of the ends, a fixed connection of the pair of flat strips with the cartridge housing or the production of these parts together.

The flat strips 11 are made sufficiently long in order to make possible support of the magnetic tape at widely spaced points. Preferably, in order to avoid tilting movements, the flat strips lie against the inner surface of the side walls of the housing halves and the narrow side 1'. The flat strips make possible by the use of a suitable arrangement of the guide pins 12, 13, and 14 the holding of the latter at least approximately in the plane of the cartridge abutment so that by narrowing the access cross-section between the narrow side 1' and the guide pins 12, 13, and 14 a flutter-free guidance of the magnetic tape 4 is enabled. Additionally the flat strips 11 provide lateral guiding means for the magnetic tape 4.

Adjacent to the openings 7 the flat strips 11 are provided with recesses 15, which in conjunction with the small depth of penetration necessary ensure operation free of obstruction for the magnetic heads.

What I claim is:

1. A magnetic tape cartridge, comprising:
   a cartridge housing including generally parallel side walls arranged in spaced apart relationship, one narrow side of said housing having two spaced access openings therein to accommodate magnetic heads, and said housing containing spool means for carrying magnetic tape;
   a pair of spaced, elongated flat strips mounted within said housing spaced from said spool means and adjacent said one narrow side, said flat strips lying generally parallel with said housing side walls, and having a length greater than the distance measured between the outer edges of said two spaced access openings;
   guide pin means carried by and extending between said spaced, elongated flat strips, adapted to guide said magnetic tape along said one narrow side of said housing;
   a lever pivotally mounted centrally thereof between said spaced, flat strips by pivot means located between said spaced access openings, said lever being disposed adjacent said one narrow side of said housing and extending lengthwise thereof, and including two oppositely directed resilient arms extending at least to the regions of said access openings; and
   a cushion on the outer end portion of each of said oppositely directed resilient arms, one of said cushions being positioned opposite each of said access openings, and said resilient arms and said cushions being adapted to support said magnetic tape.

2. A magnetic tape cartridge as recited in claim 1, wherein said guide pin means comprises three guide pins extending between and connecting said flat strips, one of said guide pins being positioned centrally of said flat strips between said access openings, and the other two pins being positioned outwardly of said access openings.

3. A magnetic tape cartridge as recited in claim 2, wherein the outer edges of said flat strips are in engagement with the inner surface of said one narrow side of said housing, said guide pins being spaced inwardly from said outer edges, and said outer edges having recesses therein in the regions of said access openings, to accommodate said magnetic heads.

4. A magnetic tape cartridge as recited in claim 1, wherein said lever includes a pair of inwardly projecting, parallel lugs centrally thereof, and is pivotally mounted by a pivot pin passing through said lugs and received in openings provided in said flat strips.

5. A magnetic tape cartridge as recited in claim 4, wherein the outer ends of said pivot pin project beyond said flat strips and are received within openings provided in the side walls of said cartridge housing, for mounting said flat strips in said housing.

* * * * *